United States Patent
Bettecken et al.

(10) Patent No.: US 10,052,921 B2
(45) Date of Patent: Aug. 21, 2018

(54) METHOD AND ARRANGEMENT FOR LOCATING THE INSTALLATION POSITION OF WHEELS IN A VEHICLE

(71) Applicant: Continental Automotive GmbH, Hannover (DE)

(72) Inventors: Juergen Bettecken, Regensburg (DE); Thomas Skotnitzki, Kirchroth (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/126,991

(22) PCT Filed: Mar. 12, 2015

(86) PCT No.: PCT/EP2015/055230
§ 371 (c)(1),
(2) Date: Sep. 16, 2016

(87) PCT Pub. No.: WO2015/140052
PCT Pub. Date: Sep. 24, 2015

(65) Prior Publication Data
US 2017/0106706 A1 Apr. 20, 2017

(30) Foreign Application Priority Data
Mar. 17, 2014 (DE) .......................... 10 2014 204 862

(51) Int. Cl.
*B60C 23/00* (2006.01)
*B60C 23/04* (2006.01)

(52) U.S. Cl.
CPC ...... *B60C 23/0416* (2013.01); *B60C 23/0408* (2013.01); *B60C 23/0488* (2013.01)

(58) Field of Classification Search
CPC ............ B60C 23/0416; B60C 23/0408; B60C 23/0488

(Continued)

(56) References Cited

U.S. PATENT DOCUMENTS 5,808,190 A * 9/1998 Ernst .................... B60C 23/061
116/34 R
6,112,587 A * 9/2000 Oldenettel .......... B60C 23/0416
340/445

(Continued)

FOREIGN PATENT DOCUMENTS

CN 101052539 A 10/2007
CN 101165997 A 4/2008

(Continued)

OTHER PUBLICATIONS

International Search Report and Written Opinion dated May 20, 2015 from corresponding International Patent Application No. PCT/EP2015/055230.

*Primary Examiner* — Zhen Y Wu (57) ABSTRACT

The invention relates to a method and an arrangement for locating the installation position of at least two wheels (2a-2d) on a vehicle (1). A first radio signal of a first first sensor (4a) which is mounted on a wheel and a second radio signal of a second first sensor (4b) which is mounted on another wheel of the at least two wheels are received. Furthermore, a first measurement value of a first second sensor, which measures an angular position of a first wheel, is received, and a second measurement value of a second second sensor (5c), which measures an angular position of a second wheel of the at least two wheels, is received. If a first phase position of the first radio signal remains within a specified tolerance range in relation to the first measurement value and a second phase position of the first radio signal remains within a specified tolerance range in relation to the second measurement value, a unique allocation by means of an angular comparison is not possible such that the installation position of the sensors or the paired wheels is located by means of a field strength measurement (FS4a, FS4c) of the first radio signal (S4a) and the second (S4c) radio signal.

20 Claims, 4 Drawing Sheets

(58) Field of Classification Search
USPC .......................................................... 340/447
See application file for complete search history.

(56) References Cited

U.S. PATENT DOCUMENTS

| | | | | | |
|---|---|---|---|---|---|
| 8,332,104 | B2* | 12/2012 | Greer | ...................... | G06F 11/30 180/167 |
| 8,436,724 | B2* | 5/2013 | Hannon | .............. | B60C 23/0416 340/445 |
| 2004/0118197 | A1* | 6/2004 | Bulst | ................... | B60C 23/0408 73/146 |
| 2004/0201277 | A1* | 10/2004 | Hentsch | ............. | G07C 9/00309 307/10.1 |
| 2005/0187667 | A1* | 8/2005 | Vredevoogd | ....... | B60C 23/0416 701/1 |
| 2007/0279237 | A1* | 12/2007 | Julian | ................... | G01S 5/0284 340/686.1 |
| 2009/0210111 | A1* | 8/2009 | Laermer | .............. | B60C 23/064 701/29.5 |
| 2011/0169627 | A1* | 7/2011 | Fink | .................... | B60C 23/0416 340/442 |
| 2012/0059551 | A1* | 3/2012 | Juzswik | .............. | B60C 23/0416 701/49 |
| 2012/0060598 | A1* | 3/2012 | Kessler | ............... | B60C 23/0416 73/146.5 |
| 2013/0169428 | A1* | 7/2013 | Shima | ................. | B60C 23/0416 340/447 |
| 2014/0172241 | A1* | 6/2014 | Shima | ................. | B60C 23/0416 701/49 |
| 2015/0057873 | A1* | 2/2015 | Lammers | ........... | B60C 23/0461 701/29.7 |
| 2015/0158347 | A1* | 6/2015 | Fritz | ................... | B60C 23/0401 340/442 |
| 2015/0165834 | A1* | 6/2015 | Laifenfeld | .......... | B60C 23/0437 340/442 |

FOREIGN PATENT DOCUMENTS

| | | |
|---|---|---|
| CN | 102099207 A | 6/2011 |
| CN | 103221237 A | 7/2013 |
| DE | 10342297 A1 | 4/2005 |
| DE | 102008049046 A1 | 4/2010 |
| EP | 1616723 A1 | 1/2006 |

* cited by examiner

METHOD AND ARRANGEMENT FOR LOCATING THE INSTALLATION POSITION OF WHEELS IN A VEHICLE

BRIEF DESCRIPTION OF THE DRAWINGS

Exemplary embodiments of the present invention are described in detail below with reference to the accompanying figures. In the figures.

In the figures—unless stated otherwise—the same and functionally equivalent elements are each provided with the same reference characters.

DETAILED DESCRIPTION

The present invention concerns a method and an arrangement for locating an installation position of at least two wheels on a vehicle, as well as a control unit, a vehicle with a suitable arrangement for locating the respective installation position and a computer program product.

The tire pressure of a motor vehicle wheel is subject to certain changes owing to diverse causes, for example the ambient pressure of the wheel, the temperature, the age of the wheel, etc. In this connection it has been determined that a falsely adjusted tire pressure constitutes a significant factor in road traffic accidents. Because vehicle safety and reliability are central factors in the automobile field, for safety reasons alone the tire pressure must already be regularly checked. For said reasons, modern vehicles such as motor vehicles comprise inter alia tire information devices, such as for example tire pressure monitoring systems. Said tire information devices comprise wheel electronics installed in the vehicle wheel that measure by means of special sensors wheel-specific measurement values of different measurement variables (for example tire pressure, tire temperature, wheel load, etc.) and send the measurement values or information derived therefrom, in particular by means of high frequency signals (RF signals) to a receiving device on the vehicle for forwarding to a central analyzing device on the vehicle.

In general, thereby any device that determines the wheel-specific information and states by means of which the fault conditions possibly occurring on the vehicle wheel can be detected can be considered to be an electronic wheel unit or wheel electronics. The term fault condition is interpreted broadly in the present connection and includes all states, properties and information of a respective wheel that can be considered to be worthy of detection.

In this connection there is however a problem of automatic and clear association of a received transmission signal with the initially unknown wheel position of the transmitter, i.e. the wheel electronics. Indeed, the wheel electronics can transmit a unique individual identifier or a unique serial number for said wheel electronics in the transmitted transmission signal or radio signal. However, it is still not known at which point on the vehicle said vehicle wheel is actually fitted, i.e. installed. In addition to the actual detection of a fault condition, it is therefore also necessary with tire information devices or tire information systems to determine the so-called installation position of the individual vehicle wheels in relation to the vehicle, in order for example to suitably inform the user or driver of the vehicle in the event of a tire (pressure) problem, e.g. with a warning notice "pressure drop left front". In the relevant literature, this is also referred to as localization of or localizing the installation position.

For example, a method for localizing vehicle wheels is known from the document DE 197 34 323 B4, with which each wheel comprises a dedicated tire pressure monitoring device, each of which sends radio signals at time intervals with corresponding tire properties and an individual identifier to a central unit on the vehicle. Furthermore, an angle of rotation sensor or a revolution rate sensor for an Anti-lock Braking System (ABS) is associated with each wheel. Using revolution sensors in the wheel electronics, the offset angle of a wheel of a motor vehicle can now be measured at two predetermined points in time. It is then determined from the signals of the ABS revolution rate sensors at which wheel of the vehicle the corresponding offset angle exists, and a corresponding association or localization is carried out. This method, also known as LSE (Localization with Synchronized Emission), does enable the automatic localization of the individual vehicle wheels, but only under certain conditions. In particular, it is necessary that there is a desynchronization of the wheels, i.e. that the wheels have a certain offset angle because of different revolution rates, for example when turning or in the event of unevenness of the road, such as potholes, and "spread apart". However, motor vehicles are also equipped with control algorithms that influence the drive train, so that said control of the drive up to four-wheel-drive works against the desynchronization that is necessary for the basic principle of LSE, and reduces the wheel spreading, sometimes even prevents it.

It is thus the object of the present invention to provide the possibility of robust localizing of vehicle wheels that can be used reliably despite the aforementioned problems.

This object is achieved by the subject matter of the independent claims. Advantageous configurations are the subject matter of the secondary claims.

According to a first aspect of the invention, a method is provided for locating a respective installation position of at least two wheels on a vehicle, in particular on a motor vehicle, that comprises the following steps. A first radio signal of a first first sensor mounted on a wheel of the at least two wheels is received, wherein the first radio signal indicates a position or angular position of the wheel. Furthermore, a second radio signal of a second first sensor mounted on a further wheel of the at least two wheels is received, wherein the second radio signal indicates a position or angular position of the further wheel. Moreover, a first measurement value of a first second sensor is received, that measures the angular position of a first wheel of the at least two wheels, and which is associated with a certain first point of the vehicle. Finally, a second measurement value of a second second sensor is received that measures the angular position of a second wheel of the at least two wheels, and that is associated with a certain second point of the vehicle. In addition, a first phase position of the first radio signal in relation to the first measurement value as well as a second phase position of the first radio signal in relation to the second measurement value are determined. If the first phase position and the second phase position each remain within a predetermined tolerance range in a predetermined observation interval, the respective installation position of the at least two wheels is determined by measuring a field strength of the first radio signal and a field strength of the second radio signal by means of a receiving device on the vehicle, wherein the respective measured field strength characterizes a distance of the receiving device on the vehicle from the first first sensor and from the second first sensor.

For this, both here and below, a first first sensor means a first sensor of a first type of sensor and a second first sensor means a second sensor of the first type of sensor. A first second sensor both here and below means a first sensor of a second type of sensor and a second second sensor means a second sensor of the second type of sensor. The second type of sensor is typically different from the first type of sensor. It is however also possible that the second type of sensor corresponds to the first type of sensor.

The advantage of the invention is thus that the method initially seeks to perform localization by comparing the angle of a first sensor on a wheel with the corresponding second sensors, for example in the form of angle of rotation sensors or revolution rate sensors of an ABS system, which as a rule are installed on the vehicle in any case, and then in the event of a possible failure of said method calling in an additional localization method by means of the field strength measurement, with which the respective measured field strength as a measure of the distance of the receiving device on the vehicle from the first first sensor and from the second first sensor enables the respective installation position to be concluded. In this way a robust and reliable capability for automatic localizing of vehicle wheels is provided.

At this point it should be noted that the invention also concerns the localizing of tires as such and the method according to the invention should also be read in the sense of a method for localizing the installation position of at least two tires on a motor vehicle. The term "wheel" would then also theoretically be replaced in the remainder of the application by the term "tire".

According to one configuration of the method, if one of the first phase position or the second phase position does not remain within the predetermined tolerance range in the predetermined observation interval and thereby a unique association of the first first sensor with one of the second sensors is not possible, the first first sensor is associated with the one of the first second sensor or second second sensor of which the associated phase position remains within the predetermined tolerance range in the predetermined observation interval. It is thereby possible with sufficient desynchronization of the wheels to perform full localizing by means of angle comparison.

According to a further configuration of the method, the first first sensor transmits the first radio signal in a predefinable position of the wheel and/or the second first sensor transmits the second radio signal in a predefinable position of the further wheel. In this case, no measurement values or a few measurement values of an angular position of a respective wheel have to be transmitted from the sensor to the receiving device, but in principle a pulsed (radio) signal is sufficient on reaching a predetermined position of the wheel. On the one hand the signal is less complex, on the other hand advantages can result during the processing of the steps of the method if a fixed angle of the wheel can be assumed. Of course, on reaching the predetermined position, other data can be transmitted, for example a respective pressure prevailing in the tire. During this the predefinable position can be selected from the group consisting of an angular position of the wheel relative to space, the entry of a point on the circumference of the wheel into a wheel contact area, the exit of a point on the circumference of the wheel from the wheel contact area and a point on the circumference of the wheel reaching the center of the wheel contact area. Said positions are simple to determine and are therefore well suited to use in the context of the invention. It should be noted here that the angular position during entry and exit to and from the wheel contact area typically varies with wheel load, tire pressure, etc. For the detection of the mentioned predefinable wheel positions, in particular acceleration sensors are suitable that can measure an acceleration transverse to the axis of rotation of the wheel, as well as piezo sensors that can detect the entry into the wheel contact area or the exit from the wheel contact area as well as the migration through said contact area.

According to a further configuration of the method, the predetermined observation interval can be selected such that it contains a predetermined number of revolutions of the first wheel or of the second wheel of the at least two wheels. It is also conceivable that the predetermined observation interval contains a predetermined time interval. In particular, it can start with the measurement of the predetermined observation interval if the first wheel or the second wheel of the at least two wheels starts (from rest) to rotate with a speed greater than a certain predetermined speed.

Moreover, it is conceivable if in general for determining the predetermined observation interval there is a wait to enter a certain operating situation of the motor vehicle, in particular on the occurrence of which the aforementioned method is started and/or ended. For example, the start and the end of a turn can be determined with a transverse acceleration sensor. At the start of making the turn, the method according to the invention can be started and begins with the measurement of the observation interval until the end of the turn is determined in order to end the measurement of the observation interval and to check whether the first phase position and the second phase position have each remained within the predetermined tolerance range in the predetermined observation interval. Besides making turns, the analysis of other operating situations in which a difference in revolution rates of the wheels usually occurs, is of course also possible. Examples thereof are severe acceleration and braking maneuvers, during which wheel spinning frequently occurs. Thus entirely "normal" operating situations of a vehicle can be used for localizing the wheels, whereby the process of the method according to the invention can run in the background and completely unnoticed by the driver. A measurement procedure specifically provided for this, which is started by drivers or users and which would therefore be perceived as a nuisance, therefore does not have to be undergone.

According to a further configuration of the method, the receiving device on the vehicle is disposed asymmetrically and close relative to the at least two wheels. This means that the distance of the receiving device on the vehicle for receiving the first or second radio signals transmitted from the respective wheel electronics from one of the wheels, for example from the first wheel, is shorter, whereas the distance from the further wheel, for example from the second wheel of the at least two wheels, is longer. In this way, it can be distinguished which installation position for a wheel is closer to the receiving device on the vehicle, because the field strength of the received radio signals of the corresponding wheel electronics typically has a higher value there. In particular, the accuracy of localizing by means of field strength measurement in relation to the asymmetrical arrangement is further improved by transmitting a radio signal from a respective wheel electronics with a predetermined transmission power. Advantageously, all radio signals are transmitted with the same transmission power. In this way the measured field strength can be used in a particularly reliable way as a measure of the distance of the receiving device on the vehicle from the wheel electronics, in order thereby to enable a conclusion to be reliably drawn regarding the respective installation position of a wheel.

According to one configuration, the first second sensor and the second second sensor can be implemented as an angle of rotation sensor or a revolution rate sensor, in particular as an ESP (electronic stability program) revolution rate sensor or an ABS (anti-lock system) revolution rate sensor.

According to a further aspect of the invention, an arrangement for localizing a respective installation position of at least two wheels on a motor vehicle is provided. In this case the arrangement comprises a first first sensor designed to output a first radio signal mounted on one wheel of the at least two wheels, wherein the first radio signal indicates a (angular) position of the wheel. Moreover, a second first sensor designed to output a second radio signal is mounted on a further wheel of the at least two wheels, wherein the second radio signal indicates a (angular) position of the further wheel. A receiving device on the vehicle is designed for receiving the first radio signal and the second radio signal. Furthermore, the arrangement comprises a first second sensor that is associated with a certain first point of the vehicle and that is designed to measure an angular position of a first wheel of the at least two wheels and to output a corresponding first measurement value. Moreover, the arrangement comprises a second second sensor that is associated with a certain second point of the vehicle and that is designed to measure an angular position of a second wheel of the at least two wheels and to output a corresponding second measurement value. Furthermore, the arrangement comprises an analyzing device on the vehicle that is designed to determine a first phase position of the first radio signal relative to the first measurement value as well as a second phase position of the first radio signal relative to the second measurement value, and that is further designed, if the first phase position and the second phase position each remain within a predetermined tolerance range in a predetermined observation interval, to determine the respective installation position of the at least two wheels by means of a measured field strength of the first radio signal and a measured field strength of the second radio signal, wherein the respective measured field strength characterizes a distance of the receiving device on the vehicle from the first first sensor and from the second first sensor.

According to a further aspect of the invention, a control unit for an arrangement for locating a respective installation position of at least two wheels on a vehicle is specified that comprises the following features. The control unit comprises a first input designed for receiving a first radio signal of a first first sensor mounted on one wheel of the at least two wheels, wherein the first radio signal indicates a (angular) position of the wheel, as well as for receiving a second radio signal of a second first sensor mounted on a further wheel of the at least two wheels, wherein the second radio signal indicates a (angular) position of the further wheel. Furthermore, the control unit comprises a second input designed for receiving a first measurement value of a first second sensor that measures the angular position of a first wheel of the at least two wheels, and that is associated with a certain first point of the vehicle, as well as for receiving a second measurement value of a second second sensor that measures the angular position of a second wheel of the at least two wheels and that is associated with a certain second point of the vehicle. Finally, the control unit comprises an analyzing device designed to determine a first phase position of the first radio signal relative to the first measurement value as well as to determine a second phase position of the first radio signal relative to the second measurement value. Moreover, the analysis device is designed to determine the respective installation position of the at least two wheels by means of a measured field strength of the first radio signal and a measured field strength of the second radio signal if the first phase position and the second phase position each remain within a predetermined tolerance range in a predetermined observation interval, wherein the respective measured field strength characterizes a distance of the receiving device on the vehicle from the first first sensor and from the second first sensor.

According to a further aspect of the invention, a vehicle is provided, for example a motor vehicle, in particular an automobile or a truck. The vehicle comprises at least two wheels. Furthermore, the vehicle comprises an arrangement for locating the respective installation positions of the at least two wheels according to a representation described above.

Advantageous configurations of the method are, if transferable to the arrangement and the control unit, also to be considered as advantageous configurations of the arrangement and of the control unit and vice-versa.

According to a further aspect of the invention, a computer program product is specified that is implemented to carry out a method as described above and below if it is executed on a control unit as described above and below.

The computer program product comprises the advantages already mentioned in connection with the corresponding embodiments of the method according to the invention or of the control unit according to the invention, which are not mentioned at this point in order to avoid repetition.

Figure 1A:
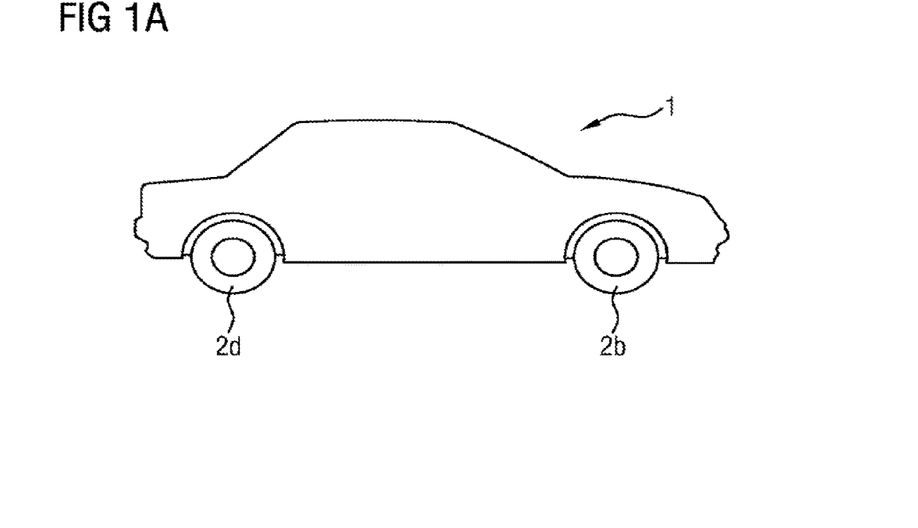
FIG. 1 shows a motor vehicle with an arrangement according to an embodiment of the invention for localizing the installation position of at least two wheels on the motor vehicle.
Figure 1B:
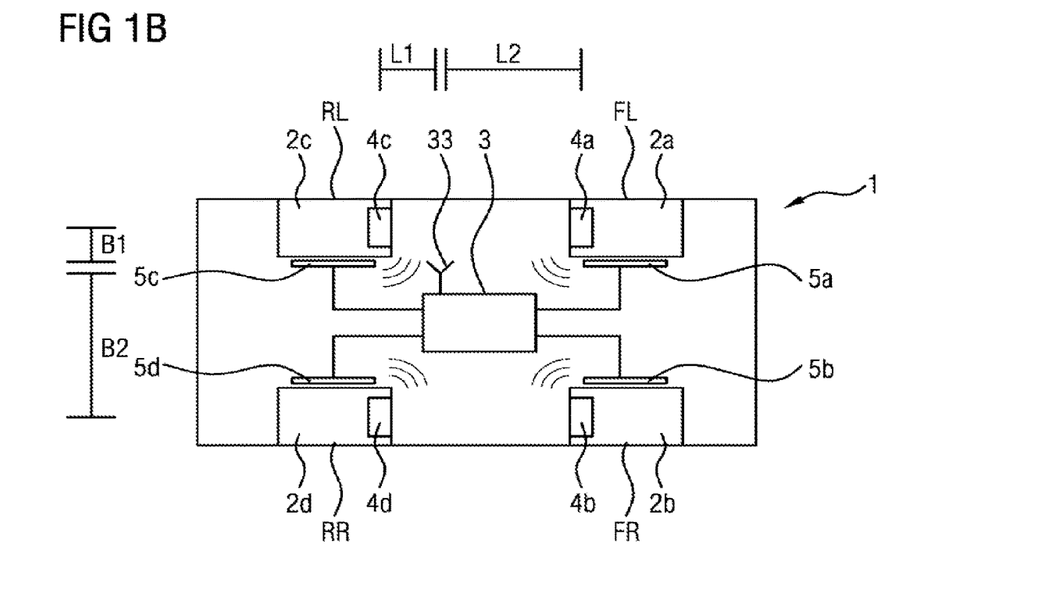

Referring first to FIG. 1, in which in FIG. 1A a vehicle 1 in the form of a motor vehicle is shown in a side view and in FIG. 1B an arrangement for localizing the installation position of at least two wheels is shown in a top view with a representation of the significant components on the vehicle. The vehicle 1 comprises four wheels 2a-2d, each with associated first sensors 4a-4d as well as a control unit on the vehicle 3 for localizing at least two of the wheels 2a-2d on the vehicle 1. Furthermore, four second sensors 5a-5d are provided that are associated with a certain position on the vehicle 1. In the example shown, the sensor 5a is disposed at the front left (FL), the sensor 5b is disposed at the front right (FR), the sensor 5c is disposed at the rear left (RL) and the sensor 5d is disposed at the rear right (RR). The first sensors 4a-4d are typically components of a tire pressure monitoring system (RDKS) of the vehicle 1, which is also referred to as a TPMS (TPMS, Tire Pressure Monitoring System). For this the first sensors 4a-4d are installed in respective wheel electronics in the corresponding vehicle wheel of the wheels 2a-2d, for example on an inner surface of a tire of the motor vehicle wheel opposite a tread of the tire or on a tire valve (this is true both for the first sensors 4a-4d shown in FIG. 1 and also for the first sensors shown in the following figures).

Figure 2:
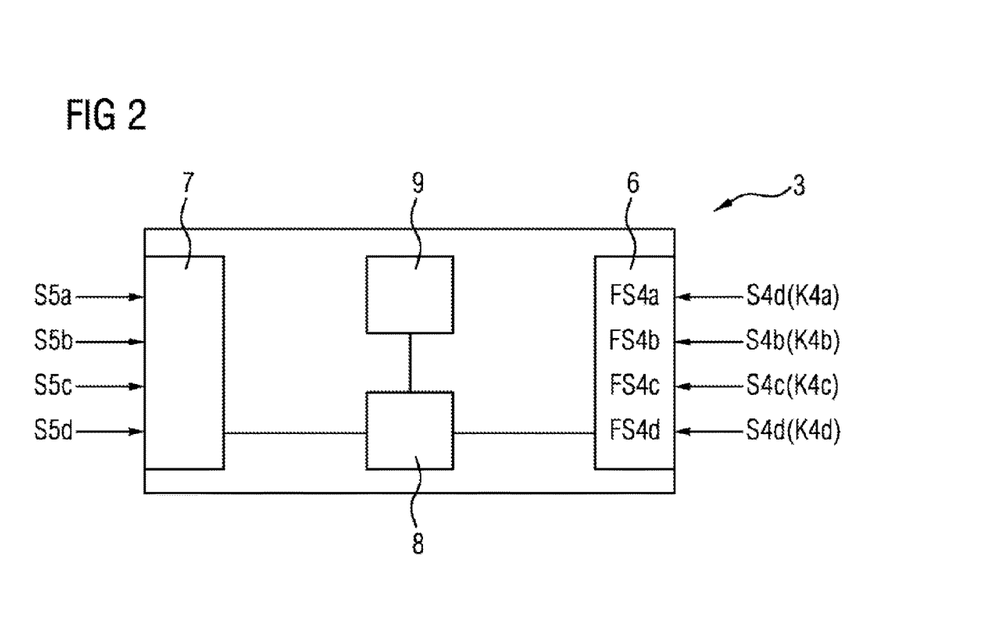
FIG. 2 shows the most important components of a control device on the vehicle for the arrangement for localizing according to FIG. 1.
Figure 3:
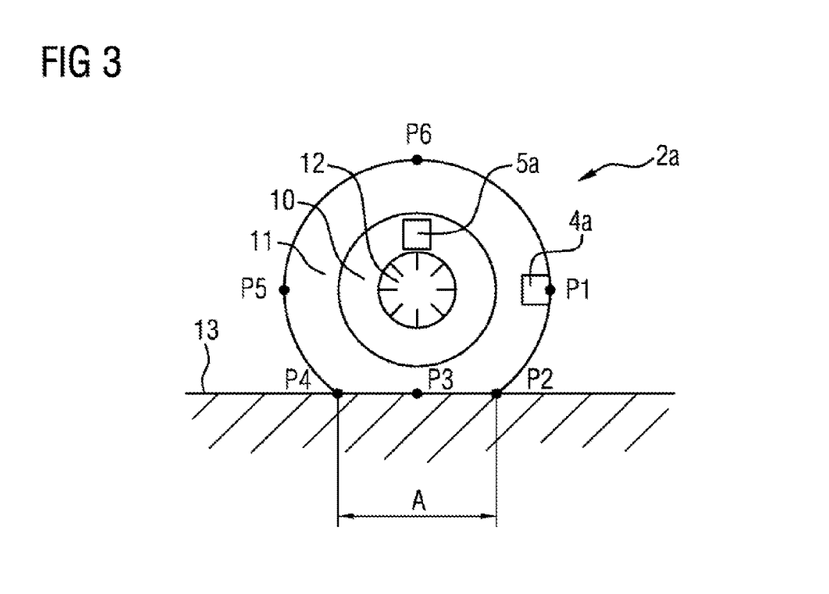
FIG. 3 shows a wheel with different sensors that are used for localizing the installation position of the wheel in a detailed view.

FIG. 2 shows a schematic representation of the significant components of the control unit 3 on the vehicle for the arrangement for localizing the installation position of the vehicle wheels. In this case the control unit 3 on the vehicle comprises a receiver 6 for detecting signals S4a-S4d of the first sensors 4a-4d transmitted by means of a radio interface and thus constitutes a first input for receiving signals, in this case radio signals of straight-sided sensors. Furthermore, an input module 7 for detecting signals S5a-S5d of the second sensors 5a-5d is provided, which thus represents a second input for receiving signals, in this case of measurement values of the second sensors. Moreover, the control unit 3 on the vehicle comprises a microcontroller 8 and a memory 9. The memory 9 can inter alia be provided to store data and processes necessary for the localizing method. As a rule, the method is stored in the memory 9 in the form of a program. The microcontroller 8 reads said program out and processes the method step for step (as will be described below in detail). The control unit 3 on the vehicle can be implemented as a separate control unit for this or as part of another control unit that also performs other control tasks of the vehicle 1. The parts of the control unit are then viewed not as physical blocks, but as functional blocks. For simplicity, however, it is assumed below that it is a separate control unit on the vehicle. Referring now to FIG. 3, in which the wheel 2a is shown in a detailed representation with the sensors associated with said wheel. The wheel 2a, which is in contact with a road 13, comprises a rim 10, a tire 11 mounted thereon and a graduated disk 12 mounted thereon. Owing to the wheel load the tire 11 deforms in the region of the wheel contact area A (also known by the term "patch") and adopts there the shape of the road, which is flat in the example shown.

The first sensor 4a, which is integrated within wheel electronics mounted on the wheel, which is also referred to as a Wheel Unit (WU), is provided to transmit a signal S4a in a certain position of the wheel 2a. This can be an angular position of the wheel relative to space, for example 3 o'clock corresponding to position P1, 9 o'clock corresponding to position P5 or 12 o'clock corresponding to position P6. Such positions can for instance be relatively simply determined in a known manner with an acceleration sensor fixedly mounted on the wheel 2a, because the acceleration due to gravity acting on the sensor always points towards the center of the Earth. If-which is not absolutely necessary-the position of the wheel 2a is to be determined exactly, superimposed accelerations, such as for example the centrifugal acceleration, accelerations of the vehicle as well as travelling on an inclined plane are to be taken into account. Besides the analysis of the direction of the acceleration due to gravity, the direction of the longitudinal accelerations during acceleration and braking of the vehicle 1 can of course also be analyzed. Entering such an operating situation can be detected either by differentiating the wheel revolution rate or with acceleration sensors installed in the vehicle 1. Thus, for example, the 3-o'clock-position P1, the 9-o'clock-position P5 and the 12-o'clock-position P6 can again be detected. In principle, the 6-o'clock-position P3 is also a position in space, but can only be determined with an acceleration sensor with difficulty, because only the acceleration due to gravity is acting on this during the entire traversal of the wheel contact area A and not only at a singular point. The position P3 is therefore treated in common with positions P2 and P4. As the position of the wheel 2a, in particular the entry of a point on the circumference of the wheel into the wheel contact area A (P2), the exit of a point on the circumference of the wheel from the wheel contact area A (P4) or a point on the circumference of the wheel reaching the center of the wheel contact area A (P3) can also be provided. For said application, for example a piezo sensor can be used that is not curved in the region of the wheel contact area A, is slightly curved outside the wheel contact area A and is strongly curved in a transition region. The position of the wheel 2a can be concluded from said deformation pattern. Because the wheel contact area A depends inter alia on the wheel load and the tire pressure, the positions P2 and P4 are not identical with a (constant) position of the wheel 2a in space.

Advantageously, the energy of deformation converted by a piezo crystal into electrical energy can also be used for the energy supply to the first sensor 2a. A battery may then be able to be omitted entirely. It is however also possible to boost an existing battery or to charge a capacitor that ensures the supply of energy over a known period of time. Because of the alternating polarity of the voltage produced by the piezo crystal, a rectifier is also to be provided.

In the example shown, the sensors 4a-4d, in particular the sensor 4a shown in FIG. 3, send corresponding signals S4a-S4d (the signal S4a in relation to the sensor 4a) to a predefinable position P1-P6 of the wheel 2a-2d (in particular 2a for the sensor 4a). Of course, the process shown also works if the control unit 3 on the vehicle calls up the position P1-P6 of a wheel 2a-2d at a certain point in time.

The second sensors 5a is provided to measure an angular position of the wheel 2a. This is carried out in the example shown in a known manner with a reflex light barrier or fork light barrier as well as a graduated disk 12. The light/dark differences are detected by the second sensor 5a and are converted into an angular position using downstream connected electronics. As such the counting pulses of the light barrier can also be directly processed further as angle-equivalents. With a larger number of the light/dark transitions applied to the graduated disk 12, a high angular resolution is possible, with a smaller number only a low angular resolution is possible. In vehicle construction, toothed disks or perforated disks are also often used, wherein because of the susceptibility to fouling at points of an optical sensor a Hall sensor can also be used if the toothed or perforated disk consists of metal. In principle of course, capacitive and inductive transducers for the measurement of the angular position of the wheel 2a are conceivable.

The angular positions of the wheels 2a-2d can be determined at little expense by analysis of the wheel revolution rate signals, such as for example are required anyway for ABS systems (anti-lock brake systems) and ESP systems (electronic stability program). Hereby at a certain point in time, such as when switching on the ignition, a segment (or even a tooth) in the wheel revolution rate sensor is defined as the null point. In relation to said position, the subsequent angle is calculated based on a count of the segments (or teeth) that are passed through.

Figure 4:
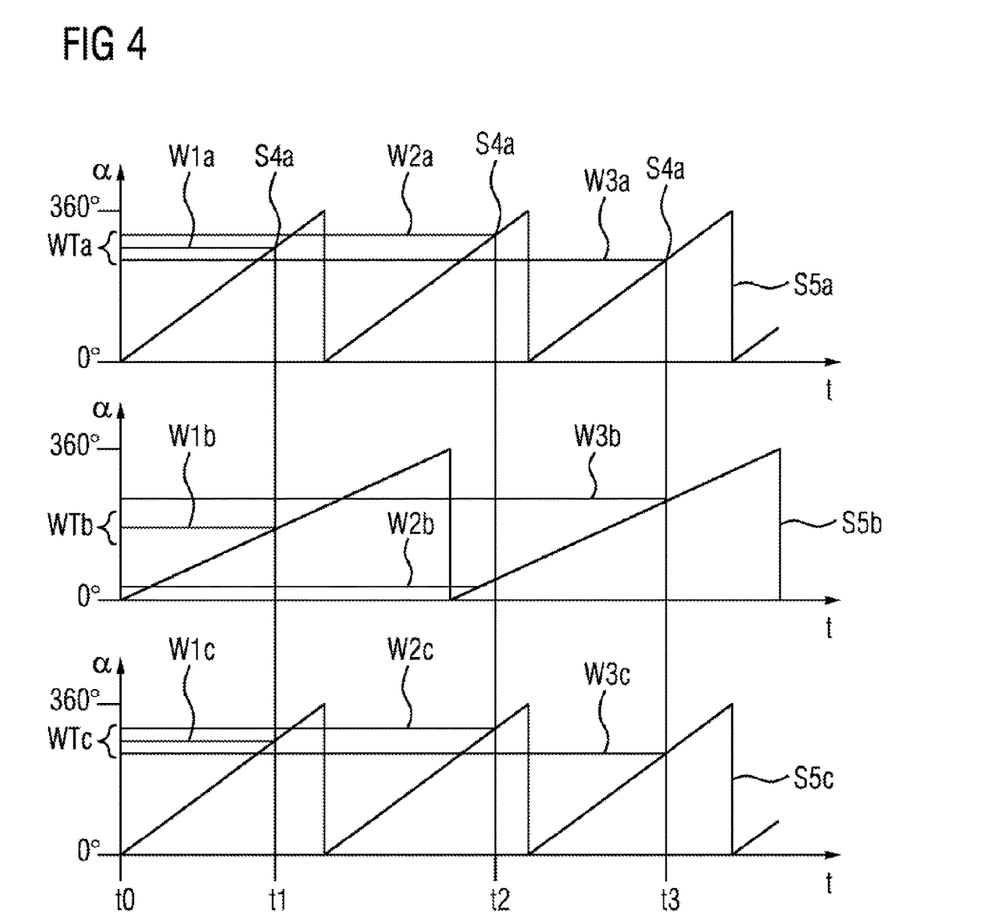
FIG. 4 shows the time profiles of the signals of a first and a plurality of second sensors for localizing the installation position.

Referring now to FIG. 4, which shows a time diagram of the first sensor 4a at the front left and three second sensors 5a (front left), 5b (front right) and 5c (rear left), wherein the signal S5a is shown at the top, the signal S5b in the center and the signal S5c at the bottom.

The signal S5a indicates a saw tooth profile, wherein a tooth corresponds to a full revolution, i.e. an angle from 0 degrees to 360 degrees, of the wheel 2a. The signal S5b also indicates a saw tooth profile, but with a lower frequency, which means that the wheel 2b is moving slower than the wheel 2a. The wheel 2c by contrast shows a frequency that essentially corresponds to that of the wheel 2a, because the two wheels are disposed on the same side. The vehicle 1 is thus located in a right turn in the example.

Figure 5:
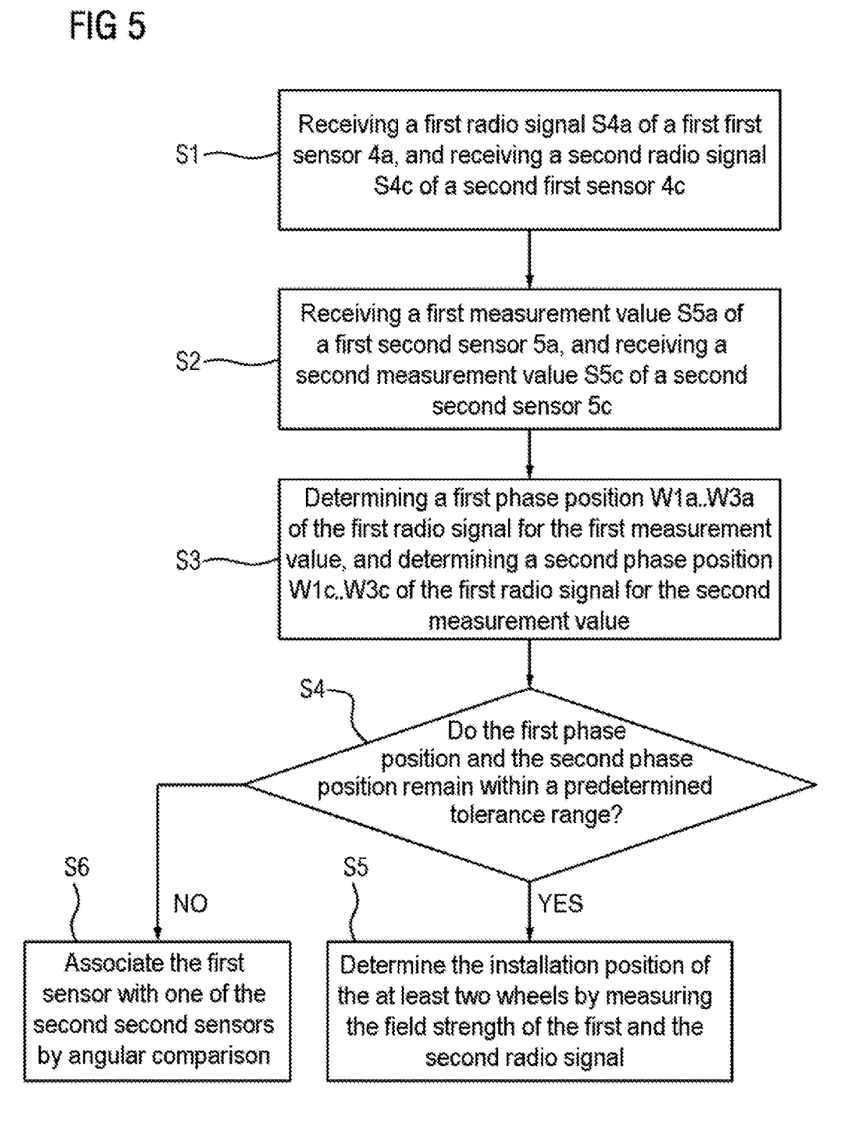
FIG. 5 shows a flow diagram for illustrating a method for localizing the installation position of wheels in a motor vehicle according to an embodiment of the invention.

The function of a method for localizing the installation position or a corresponding arrangement according to an embodiment of the invention is now described in detail using the flow diagram of FIG. 5 with reference to FIGS. 1-4.

In a first step S1, the signal S4a of the (first) first sensor 4a mounted on the wheel 2a is received. In the example shown, it is assumed that this takes place in the 9-o'clock-position P5. The transmission of the signal is carried out during this by radio, wherein other transmission options are also possible in principle. Accordingly, the signals of the rest of the first sensors, such as the signal S4c of the (second) first sensor 4c, can also be received, which said sensor transmits by radio in the 9-o'clock-position P5 relative to the wheel 2c.

In a second step S2, the signals of the second sensors, in particular the signals S5a and S5c of the second sensors 5a and 5c, are received. These correspond to the profile shown in FIG. 4, but staircase profiles can also be provided if the resolution of the second sensors 5a and 5c is lower.

At this point it should be noted that in particular the steps S1 and S2 or the sub steps contained therein cannot be executed in the specified sequence or at all in parallel. Furthermore, the signals of all first sensors 4a-4d and all second sensors 5a-5d are detected in a cycle. In the example shown, for a better overview it is further assumed that only the described signals of the first and the second indicated sensors will be analyzed.

In a third step S3 it will now be determined in which phase position W1a-W3a the signal S4a of the first sensor will be received. At a point in time t1, the signal S4a is received at a phase position W1a, at a point in time t2 in a phase position W2a and at a point in time t3 in a phase position W3a. The phase positions W1a-W3a do not remain constant, but are subject to a certain variation. This is caused for example by measurement tolerances of the sensors, as well as so-called "jitter", i.e. fluctuations against time of the measurement or the measurement value transmission.

Another reason for an offset angle during otherwise constant times for measurement and measurement value transmission is also the revolution rate of a wheel. Depending on the revolution rate, a constant processing time causes different offset angles, which can make the localizing of a wheel 2a-2d difficult or even impossible. Advantageously, in the control unit 3 on the vehicle the entire time delay from reaching a wheel position P1-P6 until the reception of the signal S4a-S4d is known in the microcontroller 8 as the analyzing device, so that said influence can be taken into account. This can be achieved for example by providing a constant time interval from reaching a wheel position P1-P6 until receiving the signal S4a-S4d. Hereby, for example wheel electronics connected to the sensors 4a-4d wait for a delay time that is dependent on the wheel revolution rate between reaching a wheel position P1-P6 until sending the signal S4a-S4d, so that the offset angle remains constant. At the same time the use of time stamps with a uniform system time is possible. In this case the wheel position P1-P6 is additionally provided with a time stamp that can be analyzed by the analyzing device or the microcontroller 8.

A significant and above all unspecified time delay can also occur during the communications between the microcontroller 8 and the sensors 4a-4d or 5a-5d by means of a communications bus (for example a CAN bus), in which defined or constant transmission times cannot be guaranteed. Advantageously, here too the measurement values are provided with time stamps, and the actual time delay can be taken into account in the microcontroller 8. For the reasons mentioned, a tolerance range WTa is provided. In the example shown, the tolerance range WTa is set such that the first determined phase position W1a lies in the center of the tolerance range WTa. This is only an exemplary example; other definitions of the tolerance range are equally possible. Analogous thereto, the phase positions W1b-W3b are determined and a tolerance range Wtb is defined, and the phase positions W1c-W3c are also determined and a corresponding tolerance range WTc is defined.

In a fourth step S4, a check is now made as to whether an association of the first sensor with one of the second sensors by angular comparison is definitely possible or not. In other words, it is determined whether the first phase position and the second phase position each remain within a predetermined tolerance range within a predetermined observation interval. Referring to FIG. 4 again, it can be seen therein that owing to the essentially coincident displacement or synchronicity of the wheels 2a and 2c in the observation interval, for example a time interval of t0-t3, the phase positions W1a-W3a are similar to the phase positions W1c-W3c, and moreover lie within a predetermined tolerance range. It is further assumed here that the tolerance ranges WTa, WTb and WTc are of equal sizes.

Owing to said equal running of the wheels 2a and 2c and thereby a similar frequency of the saw tooth profile of the signals S5a and S5c, it is thereby not possible for the control unit on the vehicle or the analyzing device thereof in the form of the microcontroller 8 to definitely associate the sensor signal S4a or the sensor 4a with the second sensor 5a or 5c.

It is now the characteristic of the described embodiment of the invention to determine the installation position of said sensor or of the wheel of the vehicle that is connected thereto, despite said impossible, or only possible with difficulty, definite association of the first sensor 4a with one of the second sensors by angular comparison. For this we refer to FIG. 1B again, in which the control unit 3 on the vehicle is shown with an antenna 33 that is mounted at a certain point on the vehicle in close proximity to the wheels 2a-2d. In this case, the antenna 33 is at a distance L1 in the longitudinal direction of the vehicle 1 from the wheels 2c and 2d or from the sensors 4c and 4d thereof in the illustrated position, and is at a distance L2 from the wheels 2a and 2b or from the corresponding sensors 4a and 4b in the illustrated position that is greater than L1 (or essentially greater). Accordingly, the antenna is also at a first distance B1 in the lateral direction of the vehicle from the wheels 2c and 2a, and is at a second distance B2 from the wheels 2d and 2b, which is approx. 4 times the distance B1. Thereby it can be quickly seen that the closest wheel to the antenna 33 as the receiving device is the wheel 2c, whereas the wheel that is furthest away is the wheel 2b. In any case, it can be determined that with the arrangement in FIG. 1B all distances of the respective wheels 2a-2d from the antenna 33 are different. Because a measured field strength of a radio signal S4a-S4d at the position of the antenna 33 is used as a measure of the distance of the respective sensor from the receiving device in the form of the antenna 33, it is possible to conclude the possible location of the transmitting sensor and thereby also the installation position FL, FR, RL, RR of the associated wheel by means of a field strength measurement or RSSI measurement (received signal strength indication) of a signal.

Returning to the problem determined during the step S4 that a definite association of the first sensor 4a with one of the second sensors 5a or 5c has to be carried out, it is now possible according to step S5 to determine the installation position of the first sensor or of the wheel 2a associated therewith or even the installation position of the sensor 4c or of the wheel 2*c* associated therewith by a field strength measurement of the radio signals S4*a* and S4*c*. Because, as already mentioned, the antenna 33 is disposed more in the rear segment of the vehicle, wherein the distance L2 from the wheel 2*a* to the antenna 33 is more than twice as great (in the figure) than the distance L1 from wheel 2*c* to the antenna 33, a definite field strength determination and thus distance determination can be carried out.

It is thereby possible that the receiver 6 already determines the received field strengths FS4*a*-FS4*d* on receiving the corresponding radio signals S4*a*-S4*d* in step S1, or that this takes place at another point in time, for example only after performing the step S4, in which signals S4*a*-S4*d* are again sent from the sensors 4*a*-4*d* to the control unit 3 on the vehicle, and by means of the antenna 33 are processed there by the receiver 6 for field strength determination.

In any case, in step S5 in the control device on the vehicle 3 the analyzing device in the form of the microcontroller 8 will receive the corresponding field strength values FS4*a*-FS4*d* (in particular the field strength values FS4*a* and FS4*c*) of a plurality of radio signals S4*a*-S4*d* (in particular the radio signals S4*a* and S4*c*). For locating the wheels 2*a* and 2*c* or the corresponding sensors 4*a* and 4*c*, it is then possible for the microcontroller 8 to detect that the measured field strength value FS4*c* is greater than the field strength value FS4*a*, so that based on said difference in the field strength it can conclude that the radio signals S4*c* must originate from a sensor close to the antenna 33, whereby a rear left position can be concluded. By contrast, the sensor signals S4*a* can be associated with a sensor further away from the antenna 33, and thereby originate from a front left position. Advantageously, a corresponding unique identifier K4*a*-K4*d* is sent with the signals S4*a*-S4*d*, so that using the identifier the microcontroller 8 can conclude which signal originates from which sensor, and finally where the sensor with a corresponding identifier is installed.

However, if it is determined in the checking step S4 that owing to a desynchronization of all wheels a definite association of a first sensor with a second sensor is possible by an angular comparison, there is a transition from step S4 to step S6. Here the fact is used that one of the first phase position or the second phase position does not remain within the predetermined tolerance range in the defined observation interval (as shown for example in relation to the profile of the signal S5*b* in the center of FIG. 4 and the corresponding phase position W1*b*-W3*b*). In this case, the first sensor 4*a* is associated with the second sensor 5*a*-5*d* of which the associated phase position remains within a predetermined tolerance range in the defined observation interval. In the case of FIG. 4, this could then apply to an association of the first sensor 4*a* with the second sensor 5*a* according the upper profile in FIG. 4 (it is assumed that in the event of a desynchronization of all wheels then the profile S5*c* also has a different shape or a different frequency in the saw tooth profile thereof, as is also the case for the profile S5*b*).

For a better understanding of step S6, it is once again made clear that the first sensor 4*a* cannot be associated a priori with a defined point of the vehicle 1. That is, the first sensor 4*a* is associated with a wheel 2*a* or a tire 11. The wheel 2*a* or the tire 11 can however be mounted at any point of the vehicle 1, for example when changing from summer tires to winter tires. This causes problems if the sensor 4*a* is also provided for tire pressure monitoring and a warning signal cannot be associated with a defined point of the vehicle 1, that is for example "front left".

From FIG. 4 it is quickly clear that as mentioned above the phase position W1*a*-W3*a* of the signal S4*a* remains within the tolerance range WTa for the signal S5*a* over the entire observation period illustrated in FIG. 4, whereas the tolerance range WTb for the second signal S5*b* has already been exited by the second detection. It is thereby clear that the wheel 2*a* with the first sensor 4*a* cannot possibly be mounted at the position of the vehicle 1 with which the second sensor 5*b* is associated, because otherwise the phase position of the signal S4*a* must correlate with the signal S5*b*. In the example shown, the first sensor can quickly be associated with the second sensor 5*a* and thereby the wheel 2*a* can be associated with a defined point of the vehicle 1, that is front left.

The method according to the illustrated embodiment of the invention can in principle run for each first sensor 4*a*-4*d* individually or all first sensors 4*a*-4*d* can be assigned at once.

Owing to the additional possibility of extending the field strength measurement of the radio signals on the sensor side for localizing, it is not absolutely necessary that the observation interval is selected to be so large that the signals S4*a*-S4*d* can be definitely associated with a certain second sensor 5*a*-5*d* by an angular comparison. Thus shorter observation intervals are also possible.

Thus owing to the asymmetrical installation of a receiving unit, such as the antenna 33, a field strength measurement of sensor side radio signals (which are advantageously transmitted with the same transmission field power) can make the method for localizing the installation position of at least two wheels in a motor vehicle more robust and reliable.

In summary, a method for localizing the installation position of at least two wheels 2*a*-2*d* on a vehicle 1 is disclosed. During this, first the installation position of the at least two wheels is carried out by an angular comparison of radio signals of first sensors on the wheels, each of which indicates a certain position P1-P6 of the wheels, with signals of second sensors on the vehicle that measure the angular position of a respective wheel and that are associated with a certain point of the vehicle. If no definite association of the installation position by the angular comparison is possible, then the installation position FL, RL, RL, RR of the at least two wheels 2*a*-2*d* is determined by measuring the field strength FS4*a*, FS4*b*, FS4*c*, FS4*d* of the respective radio signals by means of a receiving device on the vehicle, wherein the respective measured field strength as a measure of the distance of the receiving device on the vehicle from the respective first sensors on the wheel side enables a conclusion to be drawn regarding the respective installation position.

The invention claimed is:

1. A method for localizing an installation position of at least two wheels on a vehicle, comprising the steps:

receiving a first radio signal of a first first sensor mounted on one wheel of the at least two wheels, wherein the first radio signal indicates a position of the wheel;

receiving a second radio signal of a second first sensor mounted on a further wheel of the at least two wheels, wherein the second radio signal indicates a position of the further wheel;

receiving a first measurement value of a first second sensor that measures an angular position of a first wheel of the at least two wheels and that is associated with a certain first point of the vehicle;

receiving a second measurement value of a second second sensor that measures the angular position of a second wheel of the at least two wheels and that is associated with a certain second point of the vehicle;

determining a first phase position of the first radio signal relative to the first measurement value, as well as determining a second phase position of the first radio signal relative to the second measurement value; and, if the first phase position and the second phase position each remain within a predetermined tolerance range in a predetermined observation interval, determining the installation position of the at least two wheels by measuring a field strength of the first radio signal and a field strength of the second radio signal by means of a receiving device on the vehicle, wherein the respective measured field strength characterizes a distance of the receiving device on the vehicle from the first first sensor and from the second first sensor, wherein the predetermined observation interval contains at least one of a predetermined number of revolutions of at least one of the first wheel and the second wheel of the at least two wheels and a predetermined time interval.

2. The method as claimed in claim 1, wherein, if one of the first phase position or the second phase position does not remain within the predetermined tolerance range in the predetermined observation interval, the first first sensor is associated with the one of the first second sensor or the second second sensor of which the associated phase position remains within the predetermined tolerance range in the predetermined observation interval.

3. The method as claimed in claim 1, wherein the first first sensor transmits the first radio signal in a predefinable position of the wheel and/or the second first sensor transmits the second radio signal in a predefinable position of the further wheel.

4. The method as claimed in claim 3, wherein the predefinable position is selected from the group consisting of an angular position of the wheel relative to space, an entry of a point on the circumference of the wheel into a wheel contact area, an exit of a point on the circumference of the wheel from the wheel contact area and a point on the circumference of the wheel reaching a center of the wheel contact area.

5. The method as claimed in claim 1, wherein the predetermined observation interval is selected so that it contains a predetermined number of revolutions of the first wheel or of the second wheel of the at least two wheels.

6. The method as claimed in claim 1, wherein the occurrence of a certain operating situation of the vehicle is awaited for determining the predetermined observation interval.

7. The method as claimed in claim 1, wherein the receiving device on the vehicle is disposed asymmetrically relative to and close to the at least two wheels.

8. The method as claimed in claim 1, wherein the first radio signal and the second radio signal are transmitted with a predetermined equal transmission power.

9. An arrangement for localizing an installation position of at least two wheels on a vehicle, comprising:

a first first sensor mounted on one wheel of the at least two wheels and configured to output a first radio signal, wherein the first radio signal indicates a position of the wheel;

a second first sensor mounted on a further wheel of the at least two wheels and configured to output a second radio signal, wherein the second radio signal indicates a position of the further wheel;

a receiving device on the vehicle configured to receive the first radio signal and the second radio signal;

a first second sensor that is associated with a certain first point of the vehicle and that is configured to measure an angular position of a first wheel of the at least two wheels and to output a corresponding first measurement value;

a second second sensor that is associated with a certain second point of the vehicle and that is configured to measure an angular position of a second wheel of the at least two wheels and to output a corresponding second measurement value;

an analyzing device on the vehicle configured to determine a first phase position of the first radio signal relative to the first measurement value as well as to determine a second phase position of the first radio signal relative to the second measurement value; and, if the first phase position and the second phase position each remain within a predetermined tolerance range in a predetermined observation interval, to determine the installation position of the at least two wheels by means of a measured field strength of the first radio signal and a measured field strength of the second radio signal, wherein the respective measured field strength characterizes a distance of the receiving device on the vehicle from the first first sensor and from the second first sensor, wherein the predetermined observation interval contains at least one of a predetermined number of revolutions of at least one of the first wheel and the second wheel of the at least two wheels and a predetermined time interval.

10. A control unit for an arrangement for localizing an installation position of at least two wheels on a vehicle, comprising a first input configured to receive a first radio signal of a first first sensor mounted on one wheel of the at least two wheels, wherein the first radio signal indicates a position of the wheel, as well as for receiving a second radio signal of a second first sensor mounted on a further wheel of the at least two wheels, wherein the second radio signal indicates a position of the further wheel;

a second input configured to receive a first measurement value of a first second sensor that measures an angular position of a first wheel of the at least two wheels and that is associated with a certain first position of the vehicle, as well as for receiving a second measurement value of a second second sensor that measures the angular position of a second wheel of the at least two wheels and that is associated with a certain second point of the vehicle;

an analyzing device configured to determine a first phase position of the first radio signal relative to the first measurement value and configured to determine a second phase position of the first radio signal relative to the second measurement value; and configured to determine the installation position of the at least two wheels by means of a measured field strength of the first radio signal and a measured field strength of the second radio signal if the first phase position and the second phase position each remain within a predetermined tolerance range in a predetermined observation interval, wherein the respective measured field strength characterizes a distance of the receiving device on the vehicle from the first first sensor and from the second first sensor, wherein the predetermined observation interval contains at least one of a predetermined number of revolutions of at least one of the first wheel and the second wheel of the at least two wheels and a predetermined time interval.

11. A vehicle comprising:
an arrangement as claimed in claim 9, and
at least two wheels.

12. A non-transitory machine-readable storage medium storing a program causing a control unit for an arrangement for localizing an installation position of at least two wheels on a vehicle to perform a method as claimed in claim 1 when the program is executed by the control unit, the control unit comprising:
a first input configured to receive a first radio signal of a first first sensor mounted on one wheel of the at least two wheels, wherein the first radio signal indicates a position of the wheel, as well as to receive a second radio signal of a second first sensor mounted on a further wheel of the at least two wheels, wherein the second radio signal indicates a position of the further wheel;
a second input configured to receive a first measurement value of a first second sensor that measures an angular position of a first wheel of the at least two wheels and that is associated with a certain first position of the vehicle, and configured to receive a second measurement value of a second second sensor that measures the angular position of a second wheel of the at least two wheels and that is associated with a certain second point of the vehicle;
an analyzing device configured to determine a first phase position of the first radio signal relative to the first measurement value and configured to determine a second phase position of the first radio signal relative to the second measurement value, and configured to determine the installation position of the at least two wheels by means of a measured field strength of the first radio signal and a measured field strength of the second radio signal if the first phase position and the second phase position each remain within a predetermined tolerance range in a predetermined observation interval, wherein the respective measured field strength characterizes a distance of the receiving device on the vehicle from the first first sensor and from the second first sensor.

13. The non-transitory machine-readable storage medium as claimed in claim 12, wherein, if one of the first phase position or the second phase position does not remain within the predetermined tolerance range in the predetermined observation interval, the first first sensor is associated with the one of the first second sensor or the second second sensor of which the associated phase position remains within the predetermined tolerance range in the predetermined observation interval.

14. The non-transitory machine-readable storage medium as claimed in claim 12, wherein the first first sensor transmits the first radio signal in a predefinable position of the wheel and/or the second first sensor transmits the second radio signal in a predefinable position of the further wheel.

15. The non-transitory machine-readable storage medium as claimed in claim 14, wherein the predefinable position is selected from the group consisting of an angular position of the wheel relative to space, an entry of a point on the circumference of the wheel into a wheel contact area, an exit of a point on the circumference of the wheel from the wheel contact area and a point on the circumference of the wheel reaching a center of the wheel contact area.

16. The non-transitory machine-readable storage medium as claimed in claim 12, wherein the predetermined observation interval is selected so that it contains a predetermined number of revolutions of the first wheel or of the second wheel of the at least two wheels.

17. The non-transitory machine-readable storage medium as claimed in claim 12, wherein the occurrence of a certain operating situation of the vehicle is awaited for determining the predetermined observation interval.

18. The non-transitory machine-readable storage medium as claimed in claim 12, wherein the receiving device on the vehicle is disposed asymmetrically relative to and close to the at least two wheels.

19. The non-transitory machine-readable storage medium as claimed in claim 12, wherein the first radio signal and the second radio signal are transmitted with a predetermined equal transmission power.

20. The arrangement as claimed in claim 9 wherein the first radio signal and the second radio signal are transmitted with a predetermined equal transmission power.

* * * * *